April 28, 1959  J. A. HERRMANN  2,884,547
BUS DUCT UNIT FOR ELECTRICAL DISTRIBUTION SYSTEM
Filed March 1, 1957  2 Sheets-Sheet 1

INVENTOR.
JOHN A. HERRMANN

BY Ostrolenk, Faber,
Gerb & Soffen
ATTORNEYS

April 28, 1959   J. A. HERRMANN   2,884,547
BUS DUCT UNIT FOR ELECTRICAL DISTRIBUTION SYSTEM
Filed March 1, 1957   2 Sheets-Sheet 2

INVENTOR.
JOHN A. HERRMANN
BY
ATTORNEYS

United States Patent Office 2,884,547
Patented Apr. 28, 1959

2,884,547

BUS DUCT UNIT FOR ELECTRICAL DISTRIBUTION SYSTEM

John A. Herrmann, Grosse Pointe Farms, Mich., assignor, by mesne assignments, to I-T-E Circuit Breaker Company, Philadelphia, Pa., a corporation of Pennsylvania Application March 1, 1957, Serial No. 643,373

7 Claims. (Cl. 307—147)

My invention relates to a bus duct unit construction of the type shown in U.S. Patent No. 2,287,502 to A. A. Togesen et al. wherein equal current distribution between each of the bus bars of a pair of bus bars connected to a common phase is assured.

In the above-mentioned patent, a bus duct construction is described wherein a pair of buses are provided for each phase of a multi-phase system and each individual bus is then paired in a close-spaced relationship with respect to the bus of another phase which results in a substantially 180° phase displacement between the currents of adjacent close spaced buses.

The complete bus duct system is formed of individual bus duct units which are connectible to one another and these individual bus duct units are constructed to have openings therein to allow electrical connecting access to the buses.

It is, however, possible that the bus duct will be so mounted as to allow electrical connection throughout a substantial length of the system to the same buses of each pair to thereby cause a current unbalance in the buses of the system. That is to say, since each of three phases A, B, and C are formed of a pair of buses A—A′, B—B′, and C—C′ respectively, it is possible that the individual buses A, B and C, or A′, B′ and C′ will carry substantially all of the load current of the system.

The principle of my invention is to prevent this condition from happening by providing an electrical connector or jumper for each pair of buses of a common phase for each individual bus duct unit. If desired, these electrical connectors may be factory installed so that no change is required in the techniques of installing the complete bus duct system at its place of operation.

Accordingly, the primary object of my invention is to prevent current unbalance among bus bars of a pair in low reactance bus duct units comprising a pair of conductors or buses for each phase of a multi-phase system.

Another object of my invention is to provide a jumper to interconnect buses of a common phase within each individual bus duct unit of a bus duct system.

These and other objects of the present invention will become more apparent from the following description when taken in connection with the drawings in which.

Figure 1:
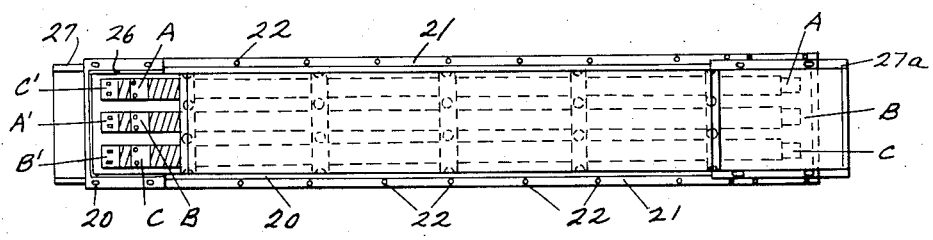
Figure 1 shows a top plan view of a bus duct unit.
Figure 2:
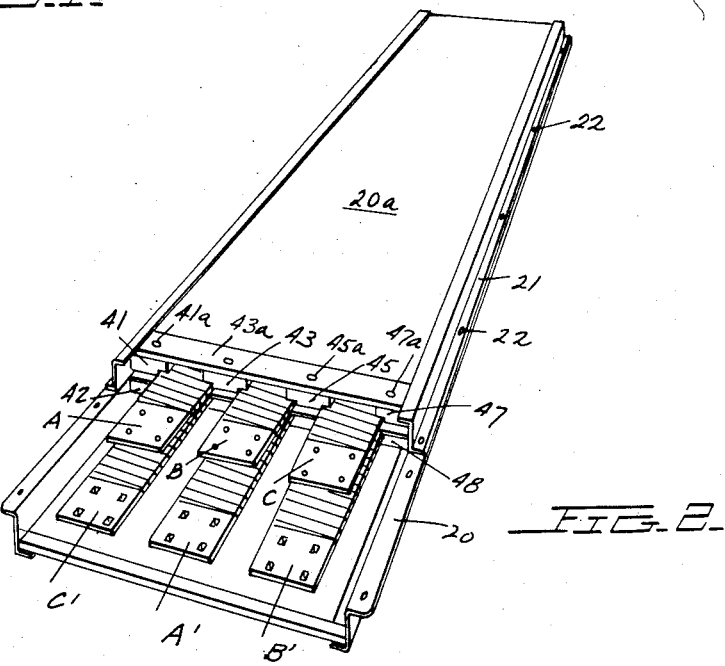
Figure 2 shows a perspective view of Figure 1.
Figure 3:
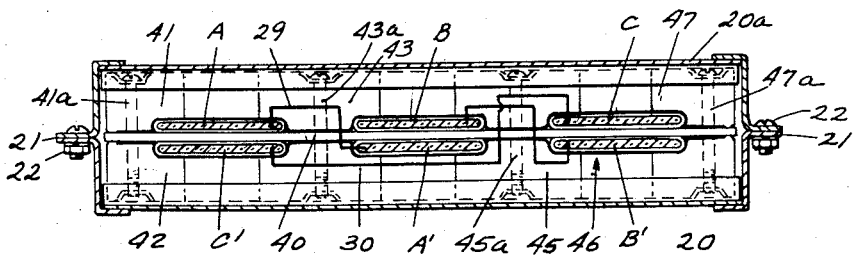
Figure 3 shows an end view of Figure 1 when it is adapted to prevent current unbalance in accordance with my novel invention.

Referring now to Figures 1, 2 and 3, it is seen that the bus duct unit shown therein consists of two identical steel halves 20 and 20a. The two steel halves 20 and 20a are provided with flanges 21 which are bolted together by bolts 22 to form the complete outside housing. It is further seen that the steel halves or bus duct sections 20 and 20a are longitudinally offset from one another to provide scarf lap joints for joining to adjacent bus duct units with a high strength, interlocked joint.

As best seen in Figures 2 and 3, adjacently positioned bus pairs A—C′, B—A′ and C—B′ are insulated from one another by insulating member 40. The buses are supported within their housing by pairs of insulator clamps which are bolted together to clamp the buses in position, the same bolt fastening the insulator clamps to the housing.

Thus insulators 41 and 42 clamp the left hand side of buses A and C′, the bolt 41a passing through member 40 and fastening the insulators 41 and 42 to the duct halves 20a and 20 respectively.

In a similar manner, the insulators 43 and 44 clamp the right hand side of buses A and C′, these insulators cooperating with bolt 43a.

The remaining insulator clamp pairs 45—46 and 47—48, which cooperate with bolts 45a and 47a operate in the same manner as that described above to support the bus pairs B—A′ and C—B′.

A plurality of support means for supporting the buses within their housing are then axially distributed along the axis of the bus housing, spaced at distances to satisfy the stress requirements of the system. By way of example, support means of the type described could be positioned at locations 50 through 53 of Figure 1.

In operation, a three phase source of power has a first phase connected to buses A and A′, a second phase connected to buses B and B′, and a third phase connected to buses C and C′. Hence, by placing buses A—C′, B—A′, and C—B′, respectively, in a close-spaced relationship as set forth in U.S. Patent No. 2,287,502, a low reactance system is achieved.

In order to provide access to make electrical connection between bus duct units, openings such as opening 26 in duct half 20 (Figure 1) which is coverable by a cover 27 and a similar opening in duct half 20a which is coverable by a cover 27a are provided. If desired, openings along the duct halves 20 and 20a are provided to make electrical tap connection to buses A, B and C, or A′, B′ and C′.

When only one set of buses is available for electrical connection, as would be the case when the bus duct is mounted along a wall or ceiling to only expose buses C′, A′ and B′ or A, B and C, it is possible that a severe current unbalance would occur to thereby overload one set of buses.

Figure 3 schematically illustrates my novel invention wherein jumpers 28, 29 and 30 are provided for each bus duct unit so as to interconnect phases B, A and C respectively. By providing this interconnection for each bus duct unit of a bus duct system I have found that a current unbalance between buses of similar phases is avoided.

Figure 4:
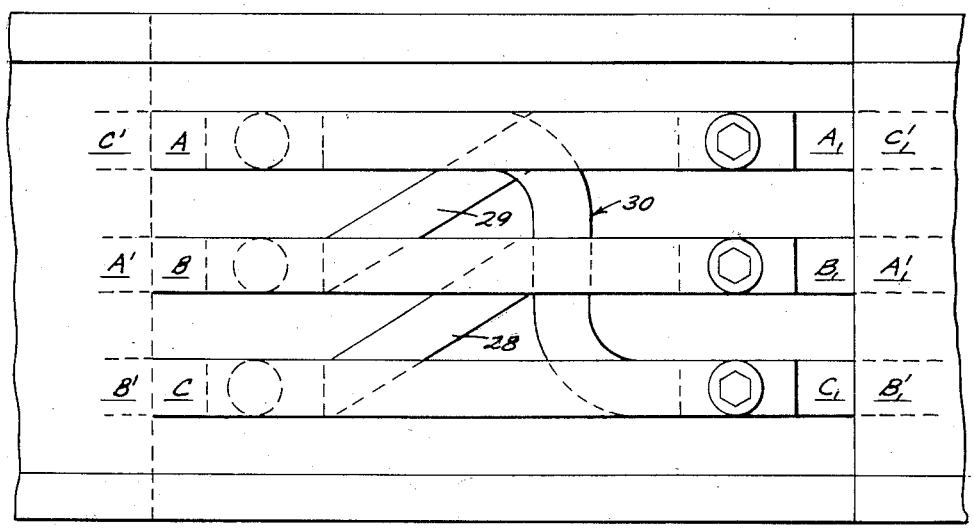
Figure 4 shows a fragmentary view of Figure 1 and illustrates the manner in which my novel jumper may be applied and the manner in which a second bus duct unit may be connected to a first bus duct unit.
Figure 5:
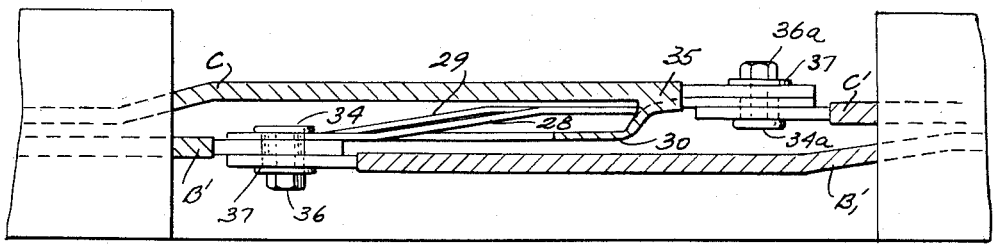
Figure 5 shows a side view of Figure 4.

Figures 4 and 5 specifically show how the jumpers 28, 29 and 30 of Figure 3 are applied to their associated buses and further show the manner in which the bus duct unit of Figures 1, 2 and 3 may be connected to a second bus duct unit.

The buses A, B, C, A′, B′, and C′ of Figures 1, 2 and 3 are shown as being the left hand unit of Figures 4 and 5, while the bus duct unit at the right of Figures 4 and 5 carries a cooperating set of buses which will be differentiated from buses A, B, C, A′, B′ and C′ by the use of a subscript numeral 1.

Figure 6:
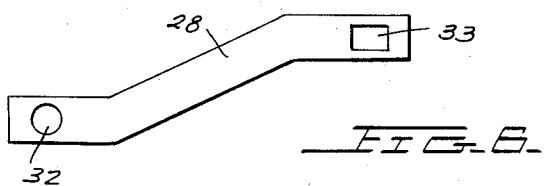
Figure 6 shows one jumper of Figures 3, 4 and 5.

The jumper connections 28, 29 and 30 are made to be an integral part of the left hand bus duct unit of Figures 4 and 5. Jumper 28 is shown in Figure 6 and has a hole 32 in its left hand end and a rectangular slot 33 in its right hand end.

The left hand end of jumper 28 is then connected to the bus B' as may be seen in Figure 5 by forcing insert 34 through the hole 32 and into a cooperating opening of the bus bar B'. Insert 34 has a tapped opening extending from the bottom thereof which receives bolt 36 through an opening in washer 37 and an appropriate through hole in bus B'$_1$. Hence, when bolt 36 is tightened, buses B' and B'$_1$ and jumper 28 will be forced into electrical contact with one another.

In a similar manner, the left hand end of jumper 29 (Figure 4), bus bar A' and bus bar A'$_1$ are connected and the left hand end of jumper 30, bus bar C' and bus bar C'$_1$ are connected.

The right hand ends of jumpers 28, 29 and 30 are each provided with the rectangular slot such as slot 33.

The manner in which the right hand end of the jumpers may be connected is illustrated in Figure 5 for the case of bus bars C and C$_1$ and the jumper 30. In this case a spline nut 34$a$ (which is identical to insert 34 carried by the left hand end of jumper 28) is carried by bus bar C$_1$ and extends through a rectangular slot in jumper 30 and a similar registering opening in bus bar C.

A bolt 36$a$ is then fastened to spline nut 34$a$ to electrically and mechanically connect bus bars C and C$_1$ and the right hand end of jumper 30, the slotted openings in jumper 30 and bus bar C allowing for any misalignments.

Since the left hand end of jumper 30 interconnects bus bars C' and C'$_1$ in the manner set forth hereinbefore for bus bars A' and B'$_1$, the jumper 30 now interconnects bus bars C, C', C$_1$ and C'$_1$.

In a similar manner, jumper 28 interconnects bus bars B, B', B$_1$ and B'$_1$ while jumper 29 interconnects bus bars A, A', A$_1$ and A'$_1$.

If desired, fastening between the jumpers and the associated bus bars may be reinforced prior to assembly by an adhesive insulating tape. For illustrative purposes, Figure 5 shows the insulating tape 35 wrapped around jumper 30 and bus bar C to secure these members together prior to assembly.

Similarly, each of the jumpers 28, 29 and 30 as well as each of the bus bars themselves may be wrapped with any desired insulating material so as to assure freedom from short circuiting between the buses.

It is to be noted that each individual bus unit of the complete system such as the left hand unit of Figures 4 and 5 may have jumpers for interconnecting bus bars of associated phases as an integral part of the bus duct unit. However, this construction will still permit the interconnection of a plurality of bus bar units in the same manner as has been previously achieved.

It should be further noted that the method of joining two individual units has not been altered even though one end of the left hand unit has been constructed to prevent a current unbalance between the front and back buses. It is to be understood that the right hand end of the bus unit at the right side of Figures 4 and 5 will be adapted to carry jumpers in the same manner as does the left hand unit of these figures.

In the foregoing, I have described my invention solely in connection with specific illustrative embodiments thereof. Since many variations and modifications of the invention will now be obvious to those skilled in the art, I prefer to be bound, not by the specific disclosure herein, but only by the appended claims.

I claim:

1. In a multi-phase bus duct comprised of individual series connectible bus duct units; each of said individual bus duct units comprising a pair of buses for each phase supported within a housing; each of said individual bus duct units being constructed to afford access to electrical connection to said buses mounted therein at one point along said bus duct unit; jumper means; said jumper means being constructed to electrically connect each pair of buses for each phase within each of said plurality of bus duct units to assure substantially equal current distribution between each bus of any of said pairs of buses.

2. In a multi-phase bus duct comprised of individual series connectible bus duct units; each of said individual bus duct units comprising a pair of buses for each phase supported within a housing; each of said buses being positioned with respect to one another to provide a low reactance system; each of said individual bus duct units being constructed to afford access for electrical connection to said buses mounted therein at one point along said bus duct unit; jumper means; said jumper means being constructed to electrically connect each pair of buses for each phase within each of said individual bus duct units to assure substantially equal current distribution between each bus of any of said pairs of buses.

3. A bus duct unit for a multi-phase bus duct system; said bus duct unit comprising a pair of buses for each phase supported within a housing; each of said buses being positioned in close-spaced relationship with a bus of a different phase, the currents in said buses in close-spaced relationship being substantially 180° phase displaced from one another; a jumper means for each of said pair of buses; each of said jumper means being constructed to electrically connect its associated pair of buses of the same phase to assure substantially equal current distribution between each bus of any of said pairs of buses.

4. A bus duct unit for a multi-phase bus duct system; said bus duct unit comprising a pair of buses for each phase supported within a housing; the ends of each of said buses being constructed to be connectible to corresponding buses of a second bus duct unit; each of said buses being positioned in close-spaced relationship with a bus of a different phase, the currents in said buses in close-spaced relationship being substantially 180° phase displaced from one another; a jumper means for each of said pair of buses; each of said jumper means being constructed to electrically connect its associated pair of buses of the same phase to assure substantially equal current distribution between each bus of any of said pairs of buses.

5. A bus duct unit for a three phase bus duct system; said bus duct unit comprising a pair of buses for each phase supported within a housing; each of said buses having a relatively flat cross section; one bus of each of said three phases being coplanar in a first plane; the other bus of each of said three phases being coplanar in a second plane parallel to said first plane; each bus in said first plane being positioned adjacent to a bus in said second plane; the currents through the buses of each pair of buses positioned adjacent to one another being substantially 180° phase displaced with respect to one another; the ends of each of said buses being constructed to be connectible to corresponding buses of a second bus duct unit; a jumper means for each of said pairs of buses; each of said jumper means being constructed to electrically connect its associated pair of buses of the same phase to assure substantially equal current distribution between each bus of any of said pairs of buses.

6. In a multi-phase bus duct comprised of individual series connectible bus duct units; each of said individual bus duct units comprising a pair of buses for each phase supported within a housing; jumper means; said jumper means being constructed to electrically connect each pair of buses for each phase within each of said individual bus duct units to assure substantially equal current distribution between each bus of any of said pairs of buses; said jumper means being connected at the junction of said pairs of buses of adjacent individual bus duct units.

7. A bus duct unit for a three phase bus duct system; said bus duct unit comprising a pair of buses for each phase supported within a housing; each of said buses having a relatively flat cross section; one bus of each of said three phases being coplanar in a first plane; the other bus of each of said three phases being coplanar in a second plane parallel to said first plane; each bus in said first plane being positioned adjacent to a bus in said second plane; the currents through the buses of each pair of buses positioned adjacent to one another being substantially 180° phase displacement with respect to one another; the ends of each of said buses being constructed to be connectible to corresponding buses of a second bus duct unit; a jumper means for each of said pairs of buses; each of said jumper means being constructed to electrically connect its associated pair of buses of the same phase to assure substantially equal current distribution between each bus of any of said pairs of buses; said jumper means being connected at the junction of said pairs of buses of adjacent individual bus duct units.

References Cited in the file of this patent
UNITED STATES PATENTS
2,287,502    Togesen et al. _____ June 23, 1942